(12) United States Patent
Kenworthy et al.

(10) Patent No.: US 10,378,835 B2
(45) Date of Patent: Aug. 13, 2019

(54) HEAT EXCHANGER WITH NON-ORTHOGONAL PERFORATIONS

(71) Applicant: Unison Industries, LLC, Jacksonville, FL (US)

(72) Inventors: Michael Thomas Kenworthy, Beavercreek, OH (US); William Dwight Gerstler, Niskayuna, NY (US); Daniel Jason Erno, Clifton Park, NY (US); Thomas Kupiszewski, Liberty Township, OH (US); Joseph Robert Coleman, Brookville, IN (US)

(73) Assignee: Unison Industries, LLC, Jacksonville, FL (US)

( * ) Notice: Subject to any disclaimer, the term of this patent is extended or adjusted under 35 U.S.C. 154(b) by 423 days.

(21) Appl. No.: 15/081,025

(22) Filed: Mar. 25, 2016

(65) Prior Publication Data

US 2017/0276440 A1    Sep. 28, 2017

(51) Int. Cl.

| F01D 25/08 | (2006.01) |
|---|---|
| F04D 29/58 | (2006.01) |
| F28F 1/00 | (2006.01) |
| F28F 13/00 | (2006.01) |
| F28D 7/16 | (2006.01) |
| F28F 1/32 | (2006.01) |
| F28F 13/02 | (2006.01) |
| B64D 13/08 | (2006.01) |

(Continued)

(52) U.S. Cl.
CPC ............ *F28F 13/003* (2013.01); *B64D 13/08* (2013.01); *F28D 7/082* (2013.01); *F28D 7/1607* (2013.01); *F28D 7/1623* (2013.01); *F28F 1/32* (2013.01); *F28F 1/325* (2013.01); *F28F 1/34* (2013.01); *F28F 13/02* (2013.01); *F05D 2260/22141* (2013.01); *F28D 2021/0021* (2013.01); *F28D 2021/0026* (2013.01)

(58) Field of Classification Search
CPC ...... F28F 1/128; F28F 1/22; F28F 1/04; F28F 1/325; F28F 13/003
USPC ........................................ 165/177; 415/177
See application file for complete search history.

(56) References Cited

U.S. PATENT DOCUMENTS

| 2,479,071 A | 8/1949 | Henstridge |
| 3,528,250 A | 9/1970 | Johnson |

(Continued)

FOREIGN PATENT DOCUMENTS

| CA | 975353 A | 9/1975 |
| CA | 2415536 A1 | 6/2004 |

(Continued)

OTHER PUBLICATIONS

Translation of Japanese Patent Document JP 2005331217 A entitled Translation—JP 2005331217 A.*

(Continued)

*Primary Examiner* — Paul Alvare
(74) *Attorney, Agent, or Firm* — McGarry Bair PC (57) ABSTRACT

A heat exchanger includes a cooling air conduit having multiple baffles, a hot air conduit having multiple passes through the cooling air conduit and forming multiple intersections with the baffles, and multiple perforations extending through the baffles. A cooling air flow passes through the baffles, rather than strictly between the baffles, and improves heat-transfer characteristics of the heat exchanger.

11 Claims, 9 Drawing Sheets

(51) Int. Cl.
*F28D 7/08* (2006.01)
*F28F 1/34* (2006.01)
*F28D 21/00* (2006.01)

(56) References Cited

U.S. PATENT DOCUMENTS

| | | | |
|---|---|---|---|
| 3,735,588 A | 5/1973 | Moskowitz et al. | |
| 3,841,271 A | 10/1974 | Harris, Jr. et al. | |
| 3,885,942 A | 5/1975 | Moore | |
| 3,948,317 A | 4/1976 | Moore | |
| 4,137,705 A | 2/1979 | Andersen et al. | |
| 4,246,959 A | 1/1981 | Byrne | |
| 4,275,785 A | 6/1981 | Kerivan | |
| 4,638,857 A | 1/1987 | Fournier | |
| 4,676,305 A | 6/1987 | Doty | |
| 4,785,879 A | 11/1988 | Longsworth et al. | |
| 4,854,380 A | 8/1989 | Yoshida et al. | |
| 4,880,055 A | 11/1989 | Niggemann et al. | |
| 5,033,542 A | 7/1991 | Jabs | |
| 5,123,242 A | 6/1992 | Miller | |
| 5,197,539 A * | 3/1993 | Hughes | F28D 1/0246 165/150 |
| 5,243,815 A | 9/1993 | Maier et al. | |
| 5,363,654 A | 11/1994 | Lee | |
| 5,511,613 A | 4/1996 | Mohn et al. | |
| 5,544,700 A | 8/1996 | Shagoury | |
| 5,775,412 A | 7/1998 | Montestruc, III et al. | |
| 5,820,654 A | 10/1998 | Gottzman et al. | |
| 6,378,605 B1 * | 4/2002 | Kutscher | F28B 1/06 165/181 |
| 6,422,306 B1 | 7/2002 | Tomlinson et al. | |
| 6,945,320 B2 | 9/2005 | Harvard, Jr. et al. | |
| 7,013,843 B1 | 3/2006 | Weintraub et al. | |
| 7,255,159 B2 | 8/2007 | Sagasser et al. | |
| 7,343,965 B2 | 3/2008 | Memory et al. | |
| 7,377,100 B2 | 5/2008 | Bruno et al. | |
| 7,779,898 B2 | 8/2010 | Morrison et al. | |
| 7,784,528 B2 | 8/2010 | Ottow et al. | |
| 7,861,512 B2 | 1/2011 | Olver et al. | |
| 8,266,888 B2 | 9/2012 | Liu | |
| 8,266,889 B2 | 9/2012 | Coffinberry | |
| 8,381,803 B2 | 2/2013 | Kim et al. | |
| 8,411,438 B2 * | 4/2013 | Kubo | H01L 23/3672 165/152 |
| 8,708,036 B2 | 4/2014 | Ikeda | |
| 8,826,970 B2 | 9/2014 | Shiraichi et al. | |
| 9,249,730 B2 | 2/2016 | Bourassa et al. | |
| 9,835,380 B2 | 12/2017 | Kupiszewski et al. | |
| 2002/0005275 A1 | 1/2002 | O'Donnell et al. | |
| 2003/0131978 A1 | 7/2003 | Nakano | |
| 2004/0069470 A1 | 4/2004 | Gorbulsky | |
| 2005/0150970 A1 | 7/2005 | Beutin et al. | |
| 2008/0095611 A1 | 4/2008 | Storage et al. | |
| 2011/0024093 A1 | 2/2011 | Shiraichi et al. | |
| 2012/0103583 A1 * | 5/2012 | Kim | F28D 1/05391 165/173 |
| 2013/0020047 A1 | 1/2013 | Army, Jr. et al. | |
| 2013/0180696 A1 | 7/2013 | Magee et al. | |
| 2014/0027099 A1 | 1/2014 | Sispera et al. | |
| 2014/0116664 A1 | 5/2014 | Landre | |
| 2014/0208768 A1 | 7/2014 | Bacic | |
| 2015/0377135 A1 | 12/2015 | Kupiszewski | |

FOREIGN PATENT DOCUMENTS

| | | | |
|---|---|---|---|
| DE | 102005049067 A1 | 4/2007 | |
| DE | 10 2012 217 323 A1 | 3/2014 | |
| EP | 0777094 A2 | 6/1997 | |
| EP | 1098156 A1 | 5/2001 | |
| EP | 1555406 A1 | 7/2005 | |
| EP | 2088371 A2 | 8/2009 | |
| EP | 2711652 A1 | 3/2014 | |
| EP | 2735791 A1 | 5/2014 | |
| EP | 2811249 A1 | 12/2014 | |
| ES | 2158731 T3 | 9/2001 | |
| GB | 400557 A | 10/1933 | |
| GB | 581742 A | 10/1946 | |
| GB | 2217828 A | 11/1989 | |
| JP | 11325753 A | 11/1999 | |
| JP | 2003166792 A | 6/2003 | |
| JP | 2004037020 A | 2/2004 | |
| JP | 2005-207688 A | 8/2005 | |
| JP | 2005331217 A * | 12/2005 | F28D 7/1623 |
| JP | 2006002622 A | 1/2006 | |
| JP | 2012117544 A | 6/2012 | |
| JP | 2014025695 A | 2/2014 | |
| SU | 709010 A3 | 1/1980 | |
| WO | 2013/157212 A1 | 10/2013 | |

OTHER PUBLICATIONS

European Search Report and Opinion issued in connection with related EP Application No. 16159798.4 dated Aug. 30, 2016.
GE Related Case Form.
European Search Report and Opinion issued in connection with Related EP Application No. 15173911.7 dated Nov. 30, 2015.
European Search Report and Opinion issued in connection with Related EP Application No. 15173866.3 dated Dec. 11, 2015.
Japanese Office Action issued in connection with Related JP Application No. 2015128237 dated Aug. 2, 2016.
U.S. Non-Final Office Action issued in connection with Related U.S. Appl. No. 14/656,789 dated May 16, 2017.
U.S. Notice of Allowance issued in connection with Related U.S. Appl. No. 14/713,363 dated Jun. 14, 2017.
Extended European Search Report and Opinion issued in connection with corresponding EP Application No. 17161001.7 dated Oct. 13, 2017.
Martinez, R., et al., Method and System for Radial Tubular Duct Heat Exchangers, GE Pending U.S. Appl. No. 62/019,171, filed Jun. 30, 2014.
Martinez, R., and Kupiszewski, T., Method and system for Radial tubular duct heat exchangers, GE Pending U.S. Appl. No. 62/018,902, filed Jun. 30, 2014.
Erno, D.J., and Gerstler, W.D., Multi-Branch Furcating Flow Heat Exchanger, GE Pending U.S. Appl. No. 62/06,0719, filed Oct. 7, 2014.

* cited by examiner

HEAT EXCHANGER WITH NON-ORTHOGONAL PERFORATIONS

BACKGROUND OF THE INVENTION

In an aircraft design, a continuous flow of hot air is bled from one part of a gas turbine engine, cooled, and provided to a specific user application. A heat exchanger may be used to cool the hot air.

Heat exchangers in aviation precoolers require the use of interrupted fins such as strip or louver fins having a straight fin geometry with no embellishment. Traditional perforated plate-fin heat exchangers used in other applications are typically stamped constructions, most often with sharp/trapezoidal plate geometries. The cooler matrix is interpenetrated by tubes in some instances. A lesser known method involves the use of perforated fins combined with contracting/expanding passages to control thermal boundary layer growth.

BRIEF DESCRIPTION OF THE INVENTION

In one embodiment, the invention relates to a heat exchanger including a cooling air conduit having at least one baffle, a hot air conduit having multiple passes through the cooling air conduit and forming multiple intersections with the baffle, and multiple perforations extending non-orthogonally through the baffle.

In another embodiment, the invention relates to a heat exchanger including a first air conduit having at least one baffle, arranged parallel to a streamline through the first air conduit, a second air conduit comprising multiple passes extending through the first air conduit, arranged perpendicular to the streamline, and forming multiple intersections with the baffle, and multiple perforations extending through the baffle, each perforation having an inlet, an outlet, and a passage connecting the inlet and the outlet, with the outlet being located downstream of the inlet.

DESCRIPTION OF EMBODIMENTS OF THE INVENTION

Embodiments of the invention described herein relate to a heat exchanger and in particular to an improved heat-transfer fin for a heat exchanger. The heat exchanger may be implemented in any environment, including, but not limited to, an aircraft gas turbine engine.

While the term "air" is used throughout the specification in the discussion of the heat exchanger, including in phrases such as, but not limited to, "cooling air" and "hot air," it is understood that various fluids can be supplied to the heat exchanger, including, for example, ambient or atmospheric air, various other gases such as $CO_2$ or mixtures thereof, and various liquids, including water or refrigerants.

Figures 1, 2:
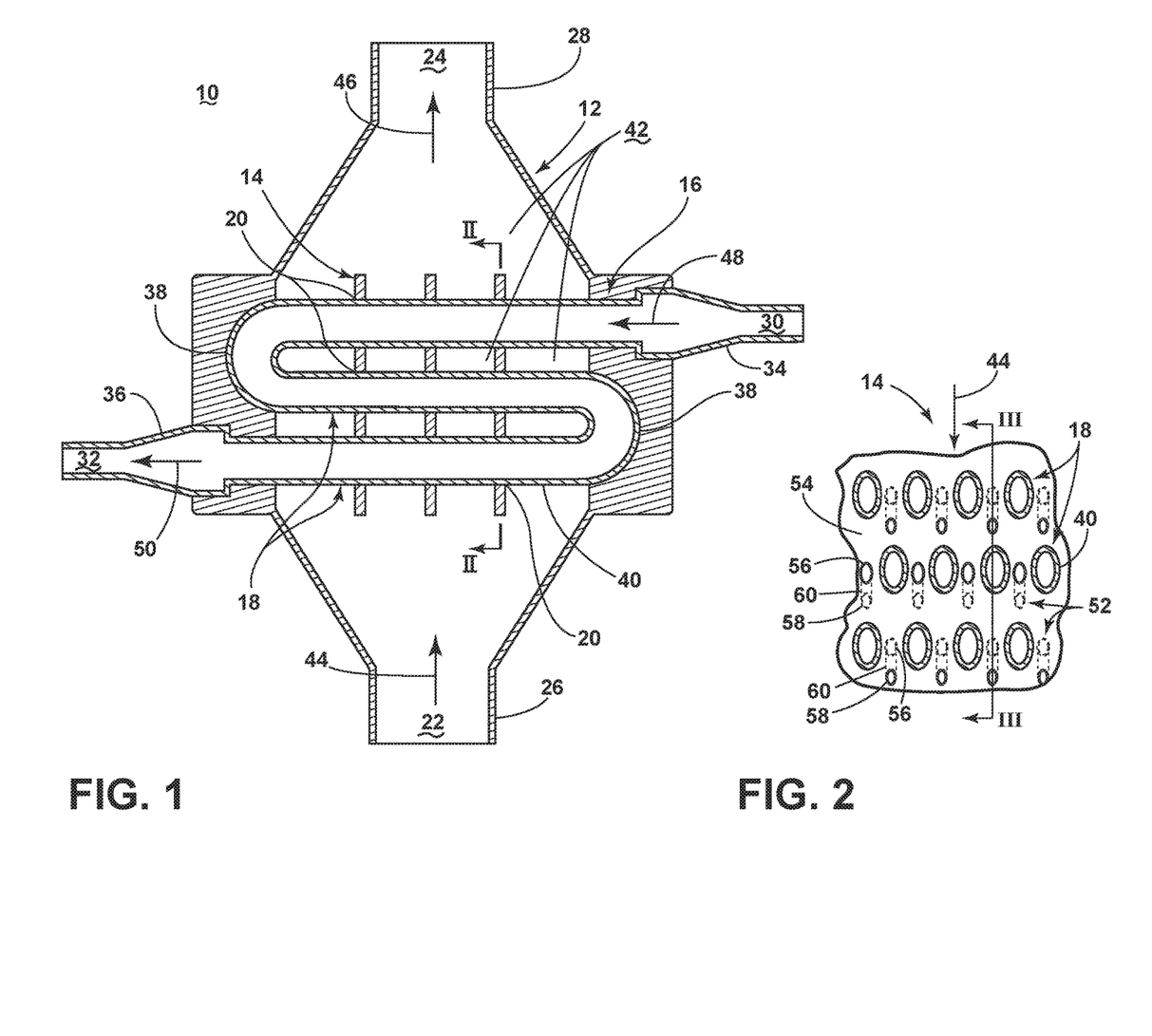
FIG. 1 is a schematic representation of a heat exchanger in accordance with one embodiment of the invention.
FIG. 2 is a sectional view through line II-II of FIG. 1.

FIG. 1 is a schematic representation of a heat exchanger 10 according to one embodiment of the invention. The heat exchanger 10 includes a first air conduit 12 and a second air conduit 16 between which heat exchange is performed. The first air conduit 12 can be a cooling air conduit 12 having at least one baffle 14 within the conduit 12, and illustrated herein as having multiple, spaced baffles 14, and the second air conduit 16 can be a hot air conduit 16 having multiple passes 18 through the cooling air conduit 12 and forming multiple intersections 20 with the baffles 14. Heat exchange is performed between hot air flowing through the hot air conduit 16 and cooling air flowing through the cooling air conduit 12.

The cooling air conduit 12 can include a cooling air inlet 22 and a cooling air outlet 24. For an aircraft gas turbine engine, the cooling air inlet 22 can receive cooling air from any source having a temperature and pressure that are lower than that flowing through the hot air conduit 16 and the cooling air outlet 24 transports the heated cooling air away from the heat exchanger 10. For example, the cooling air can be sourced from bypass air, FLADE air, or compressor air bleed (such as from a low pressure stage). Headers 26, 28 can define one or both of the inlet and outlet 22, 24, respectively.

The passes 18 can be spaced in a flow-wise direction along the cooling air conduit 12, i.e. in the direction of air flowing from the inlet 22 to the outlet 24. The passes 18 can alternatively be spaced opposite the flow-wise direction. Spacing the passes 18 in the flow-wise direction exposes the coldest cooling air to the air exiting the hot air side of the heat exchanger 10, which usually results in greater effectiveness than if the passes 18 were opposite the flow-wise direction.

The hot air conduit 16 can include a hot air inlet 30 and a hot air outlet 32. For an aircraft gas turbine engine, the hot air inlet 30 typically receives hot air input bled from a portion of the engine core and the hot air outlet 32 transports the cooled bleed air away from the heat exchanger 10. Headers 34, 36 can define one or both of the inlet and outlet 30, 32, respectively. In addition to the multiple passes 18, which are illustrated as being generally linear, the hot air conduit 16 can include multiple returns 38 that connect at least one pass 18 to at least one other pass 18. The returns 38 may be inside or outside the cold volume defined by the cooling air conduit 12, and are illustrated herein as being outside the cold volume in order to maximize the cold volume. Together, the passes 18 and returns 38 can define a serpentine conduit for the hot air conduit 16. The serpentine conduit can wind back and forth through the cooling air conduit 12 multiple times.

It is noted that while only three passes 18 and two returns 38 is shown in FIG. 1, it is understood that the heat exchanger 10 may have additional passes 18 and returns 38. Further, the returns 38 may be defined by one or more return manifolds; one return manifold can define multiple returns 38 for the hot air conduit 16.

The hot air conduit 16 can be provided with one or more tubes 40 defining at least a portion of the hot air conduit 16 passing through the cold volume of the cooling air conduit 12. A single tube 40 can have multiple passes 18 and multiple returns 38, and a single tube 40 or multiple tubes 40 can be provided to form the hot air conduit 16. In the illustrated embodiment, a single tube 40 is shown as forming multiple passes 18 and multiple returns 38 of the hot air conduit 16; however it is to be understood that the heat exchanger 10 can be provided with multiple tubes 40, each having multiple passes 18 and returns 38, that are not visible in the sectional view of FIG. 1. The inlet header 34 can supply hot air to the tubes 40 and the outlet header 36 can collect air discharged from the tubes 40.

The baffles 14 can be formed as thin plates or fins that increase the heat exchange area between the hot air passing through the passes 18 and the cooling air. The baffles 14, as well as the tube 40 forming the passes 18, can be made from materials having heat-conducting ability. The baffles 14 can be disposed generally perpendicularly to the axis of the passes 18, such that the intersections 20 between the baffles 14 and passes 18 generally form right angles.

Within the cooling air conduit 12, the spaces between the baffles 14 and the passes 18 form openings 42 for cooling air supply 44 and cooling air discharge 46, as designed by arrows in FIG. 1, through the cooling air inlet 22 and cooling air outlet 24, respectively. Hot air supply 48 and hot air discharge 50, also designed by arrows, enter and exit the hot air conduit 16 through the hot air inlet 30 and hot air outlet 32, respectively.

The cooling air supply 44 can generally define multiple streamlines of air through the cooling air conduit 12, with the arrow of supply 44 representing one such streamline, and the baffles 14 are generally parallel to each other and parallel to the streamline represented by arrow 44. With the baffles 14 being disposed generally perpendicularly the passes 18, the passes will be perpendicular to the streamline represented by arrow 44.

While the illustrated heat exchanger 10 is shown as being configured so that cooling air is supplied and discharged substantially perpendicularly to hot air, it is understood that other relative orientations between the supply and discharge flows are possible. It is also understood that while both the cooling air and hot air conduits 12, 16 are each shown as having their incoming supply and outgoing discharge flows be substantially parallel to each other through opposing ends of the heat exchanger 10, other configurations are possible, such as the supply and discharge flows being substantially perpendicular to each other, or the supply and discharge flows extending though a common side of the heat exchanger 10, but in opposing directions.

FIG. 2 is a sectional view through line II-II of FIG. 1. As shown in FIG. 2, multiple perforations 52 extend through the baffles 14. The perforations 52 allow the cooling air to flow through the baffles 14, rather than strictly between the baffles 14, which provides improved heat-transfer characteristics to the heat exchanger 10.

The perforations 52 can extend non-orthogonally through the baffles 14, such that the perforations 52 intersect the baffle 14 at a non-right angle. For example, the baffles 14 can define opposing surfaces or sides 54 that are generally parallel to each other, at least in a localized region of the baffle 14 around the perforation 52, and the perforation 52 can extend between the opposing sides 54 at an acute or obtuse angle, depending on the reference point.

The perforations 52 can comprise an inlet 56, an outlet 58, and a passage 60 connecting the inlet 56 to the outlet 58. The outlet 58 is downstream of the inlet 56, such that air enters the perforation 52 through the inlet 56, flows through the passage 60, and exits the perforation 52 through the outlet 58. The inlet 56 and outlet 58 can be formed substantially at the surface 54 of the baffle 14, with the passage 60 extending though the baffle 14 itself. Some embodiments of the perforation 52 may have the inlet 56 and outlet 58 formed on opposite sides 54 of the baffle 14, while other embodiments of the perforation 52 have the inlet 56 and outlet 58 on the same side 54 of the baffle 14.

In the illustrated embodiment, the perforations 52 alternate along the direction of cooling air flow 44, such that the inlet 56 of one perforation 52 is formed on the same side 54 of the baffle 14 as the outlet 58 of the downstream perforation 52, and so on. This produces a cyclic flow of air from one side of the baffle 14 to the other. Further, the perforations 52 can be staggered, such that the perforations 52 are aligned with a tube 40 or pass 18, rather than another perforation 52 in the general flow direction of the cooling air supply 44. Here, the perforations 52 are located between streamline-adjacent intersections 20 with the passes 18. This lengthens the distance the cooling air travels and increases heat transfer. The air exiting one perforation 52 along a straight-line path encounters a tube 40, which forces the air to flow around the tube 40.

The perforations 52 can be provided between the tubes 40 defining the passes 18. The tubes 40 may have any cross-sectional shape, and are illustrated herein as being elliptical. Other shapes for the tubes 40 include oval, circular or round. The shape of the tubes 40 can depend on the flow characteristics of the heat exchanger.

The passes 18 can be spaced in a flow-wise direction, i.e. in the general direction of the cooling air supply 44, along the cooling air conduit 12. The passes 18 can further be staggered in a streamline direction along the cooling air conduit 12, such that one pass 18 is not immediately downstream of another pass 18. In an alternate embodiment, the passes 18 can be staggered in a flow-wise direction.

Figure 3:
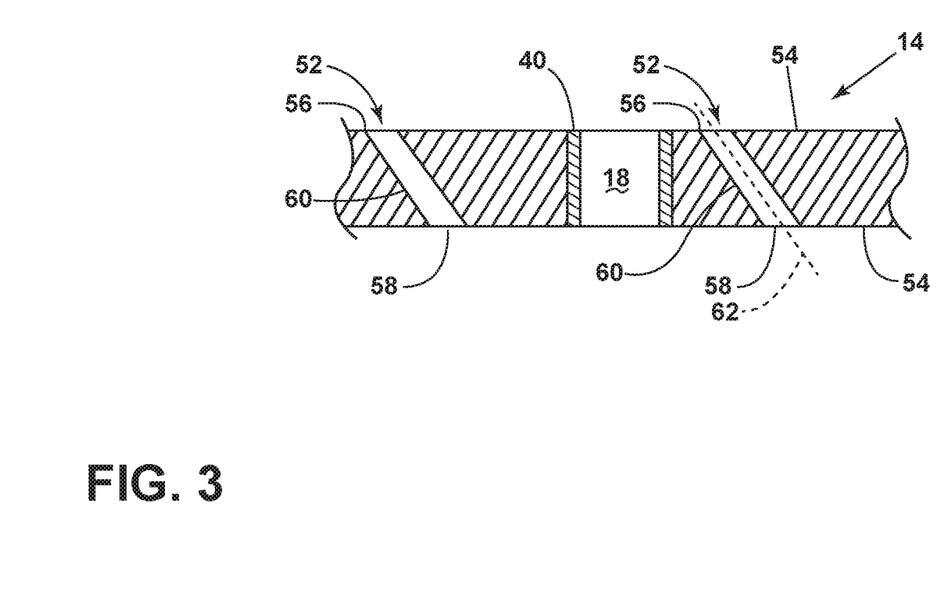
FIG. 3 is a sectional view through line of FIG. 2.

FIG. 3 is a sectional view through line of FIG. 2. The passage 60 defines a centerline 62, which is an axis through the passage 60 from the inlet 56 to the outlet 58 that follows the geometric centers of two-dimensional regions of the passage 60 perpendicular to the general direction of air flow through the passage 60. In some embodiments of the perforation 52, the centerline 62 can be non-parallel to a local streamline of the cooling air conduit 12, i.e. the streamline at the perforation 52. In this case, the inlet 56 and outlet 58 can be formed on opposite sides 54 of the baffle 14.

The passage 60 may be linear, such that the centerline 62 forms a straight line, or curvilinear, such that the centerline 62 forms a curved line. In the case of a linear passage 60, the inlet 56 and outlet 58 of the passage 60 will be on opposite sides 54 of the baffle 14. In the case of a curvilinear passage 60, the inlet 56 and outlet 58 can be formed on opposite sides or the same side of the baffle 14.

Figure 4:
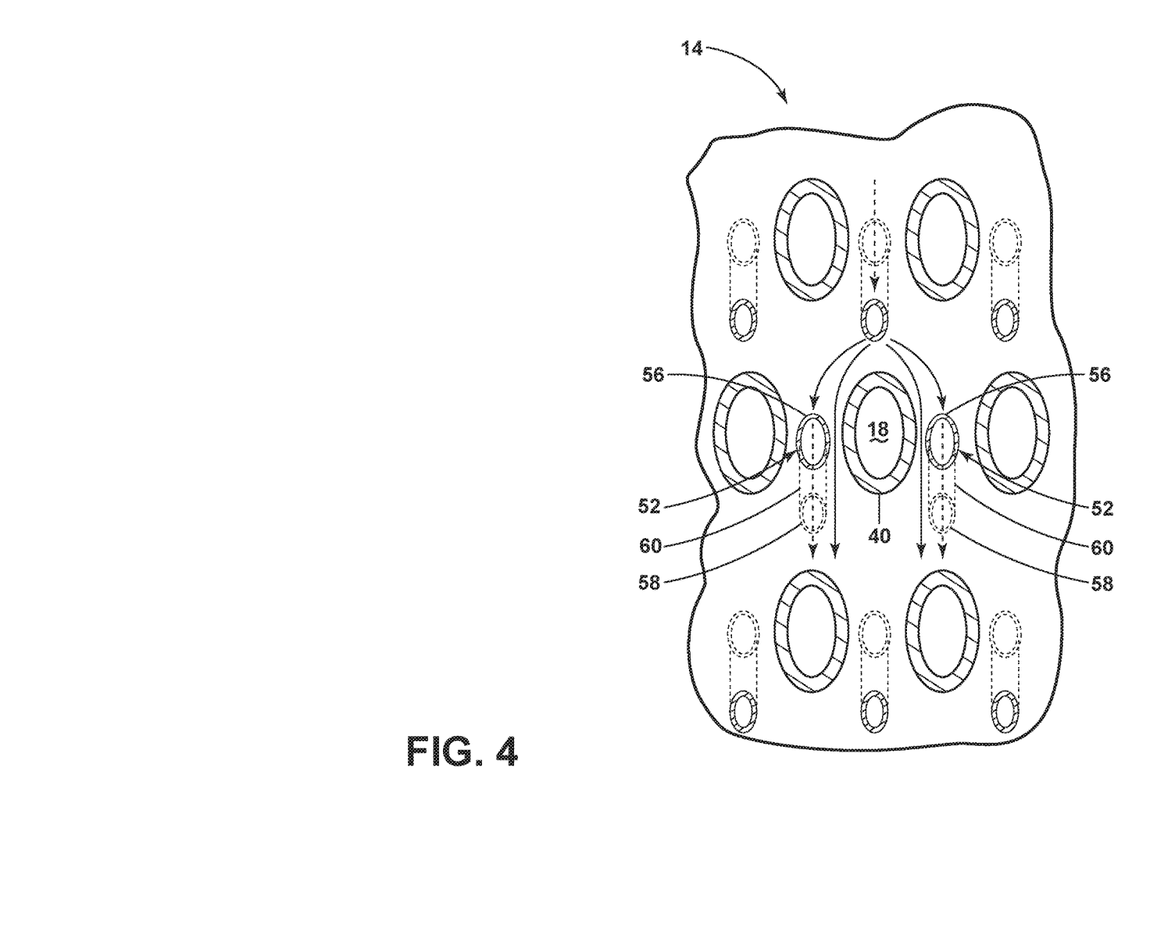
FIG. 4 is a close-up view similar to FIG. 2 showing a portion of the flow path for cooling air through the portion of the heat exchanger.

FIG. 4 is a view similar to FIG. 2, showing a portion of the flow path for the cooling air supply 44. Arrows are used in FIG. 4 to generally represent the streamlines of the air flow, and it is understood that the actual air flow in operation may deviate from what is represented. Cooling air flows between and through the baffles 14, with portions of the cooling air traveling internally through the perforations 52 and other portions of the cooling air passing externally over the surface 54. Air entering through the inlet 56 of one perforation 52 travels through the passage 60 and exits the outlet 58 through the opposite side 54 of the baffle 14. The air exiting the outlet 58 encounters a tube 40, which forces the air to flow around the tube 40.

On a system-wide level, air cyclically enters and exits opposite sides of the baffle 14 via the perforations 52, while also traveling between the tubes 40 and between adjacent baffles 14. The non-orthogonal perforations 52 through the otherwise substantially flat baffles 14 produces a breathing effect, with the air expanding and contracting as it passes into and out of the baffles 14. The perforations 52 further have smooth transitions with the baffle surface 54, which minimizes the minor losses associated with each contraction/expansion. The angled perforations 52 improves the cross flow to make sure that the emerging flow from the perforation remains attached as a boundary layer to the opposite surface of the baffles 14. The angled perforations 52 further increase the surface area available for heat exchange, in comparison to a non-angled perforation.

Figure 5:
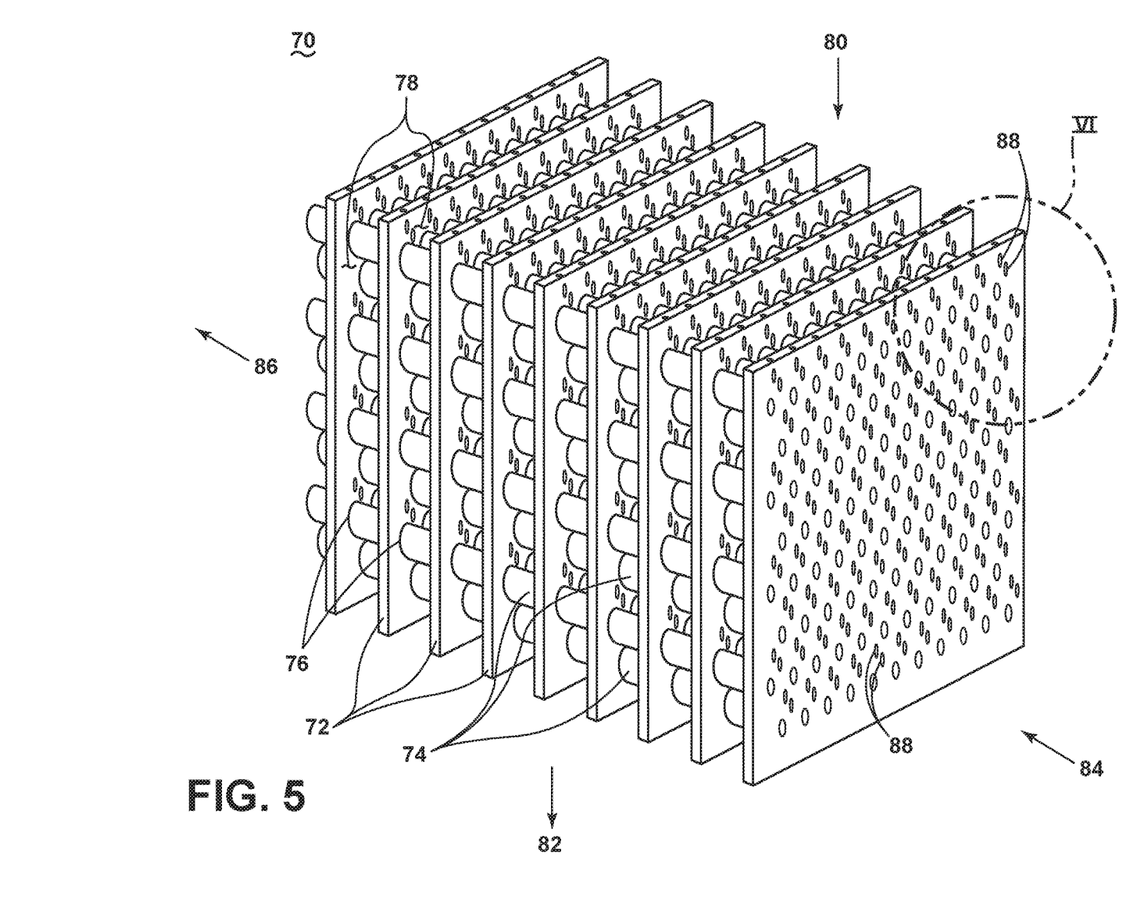
FIG. 5 is a perspective view of a portion of a heat exchanger according to another embodiment of the invention.

FIG. 5 is a perspective view of a portion of a heat exchanger 70 according to another embodiment of the invention. The portion of the heat exchanger 70 shown in FIG. 4 may be substantially similar to the heat exchanger shown in FIG. 1, save for the configuration of the perforations. The portion of the heat exchanger 70 illustrated includes multiple spaced baffles 72 within the cooling air conduit and multiple passes 74 of the hot air conduit that forms multiple intersections 76 with the baffles 72. While not shown, the passes 74 can be connected by multiple returns that connect at least one pass 74 to at least one other pass 74, as described for FIG. 1. Further, the returns may be defined by one or more return manifolds; one return manifold can define multiple returns for the passes 74.

The spaces between the baffles 72 and the passes 74 form openings 78 for cooling air supply 80 and cooling air discharge 82, as designed by arrows in FIG. 5. Hot air supply 84 and hot air discharge 86, also designed by arrows, generally enter and exit the portion of the heat exchanger 70 as shown, although the hot air may follow a serpentine path through the passes 74 themselves, as described for the first embodiment. As for the first embodiment, multiple perforations 88 extend through the baffles 72, and allow the cooling air to flow through the baffles 72, rather than strictly between the baffles 72, which provides improved heat-transfer characteristics to the heat exchanger.

Figure 6:
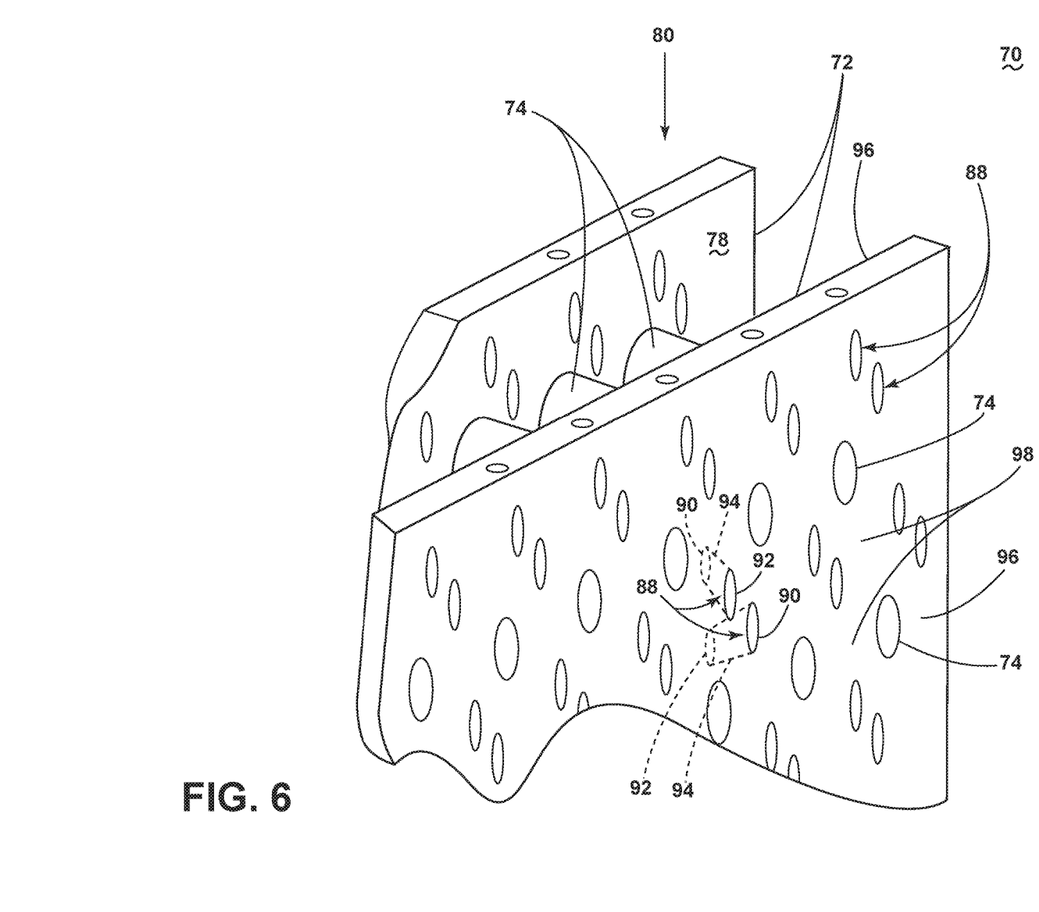
FIG. 6 is a close up view of section VI of FIG. 5.

FIG. 6 is a close up view of section VI of FIG. 5. In the illustrated embodiment, the perforations 88 can extend non-orthogonally through the baffles 72 and can be arranged in pairs between the passes 74. This arrangement of perforations 88 can increase mixing, resulting in improved break-up of the thermal boundary layer that occurs along the baffles 72.

The perforations 88 can comprise an inlet 90 connected to an outlet 92 via a passage (not shown). The inlet 90 and outlets 92 can be formed substantially at one of the opposing surfaces or sides 96 of the baffle 72, with the passage extending though the baffle 72 itself. In the illustrated embodiment, each perforation 88 has its respective inlet 90 and outlet 92 formed on opposite sides 94 of the baffle 72, and the perforations 88 are staggered between the passes 74.

While the baffles 72 are shown as having flat or planar sides 96, the sides 96 can alternatively be provided with a surface contour that will affect the airflow over and between the baffles 72. For example, the areas of the sides 96 between the perforations 88 and passes 74 may be provided with concavities or dimples at sites 98 for trapping the streamlines of air flowing out of the perforations 88 over the baffles 72.

Figure 7:
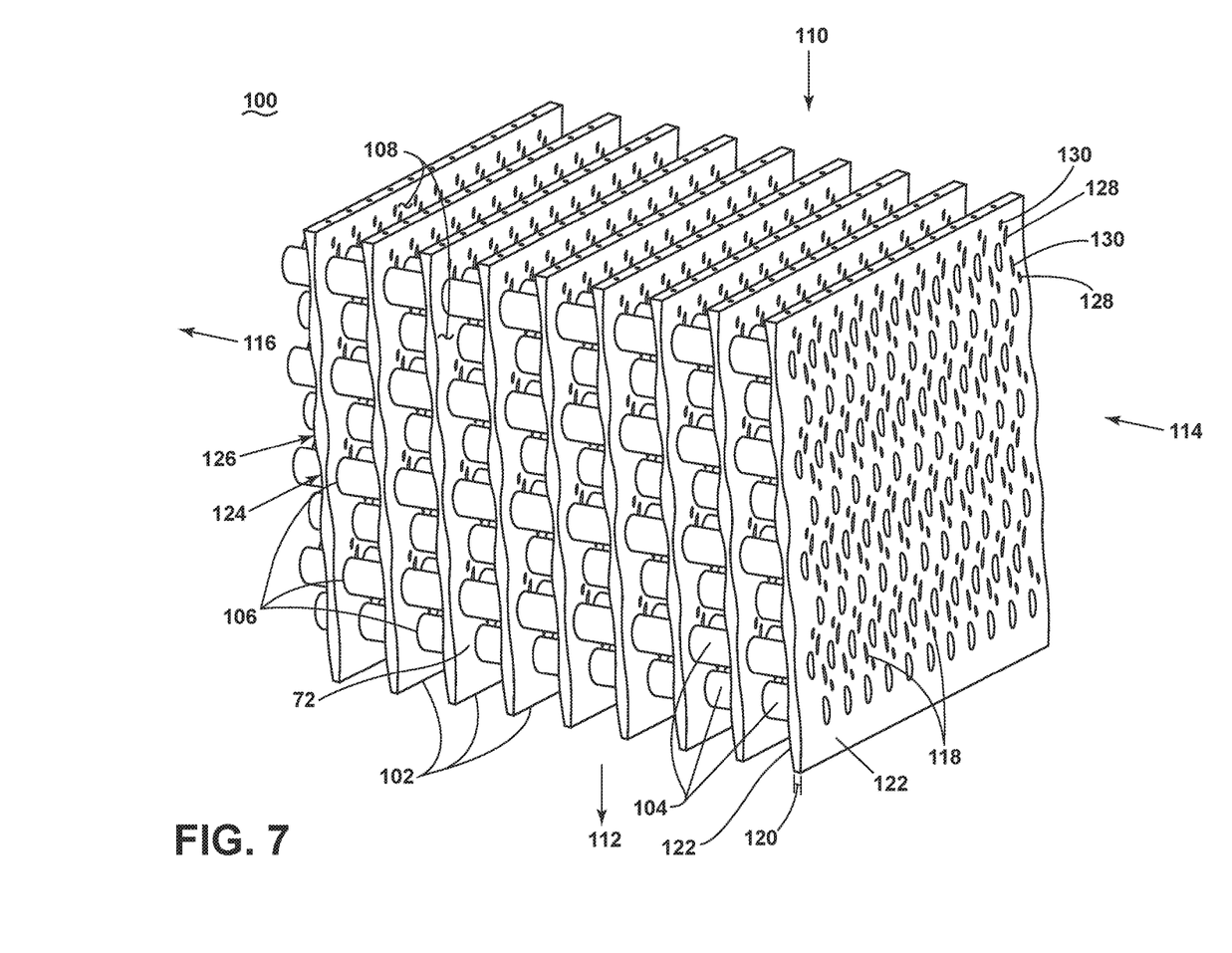
FIG. 7 is a perspective view of a portion of a heat exchanger according to another embodiment of the invention.

FIG. 7 is a perspective view of a portion of a heat exchanger 100 according to another embodiment of the invention. The portion of the heat exchanger 100 shown in FIG. 7 may be substantially similar to the portion of the heat exchanger 100 shown in FIG. 5, save for the configuration of the baffles. The portion of the heat exchanger 10 illustrated includes multiple spaced baffles 102 within the cooling air conduit and multiple passes 104 of the hot air conduit that forms multiple intersections 106 with the baffles 102. While not shown, the passes 104 can be connected by multiple returns that connect at least one pass 104 to at least one other pass 104, as described for FIG. 1. Further, the returns may be defined by one or more return manifolds; one return manifold can define multiple returns for the passes 104.

The spaces between the baffles 102 and the passes 104 form openings 108 for cooling air supply 110 and cooling air discharge 112, as designed by arrows in FIG. 7. Hot air supply 114 and hot air discharge 116, also designed by arrows, generally enter and exit the portion of the heat exchanger 100 as shown, although the hot air may follow a serpentine path through the passes 104 themselves, as described for the first embodiment. As for the previous embodiments, multiple perforations 118 extend through the baffles 102, and allow the cooling air to flow through the baffles 102, rather than strictly between the baffles 102, which provides improved heat-transfer characteristics to the heat exchanger.

The baffles 102 shown in FIG. 7 are wavy instead of planar when viewed from the side, and accordingly have a modulating thickness 120 such that the thickness 120 of the baffles 102 varies along a flow-wise direction along the cooling air conduit. The thickness 120 of the baffles 102 is defined between opposing surfaces 122 of the baffles 102.

The wavy baffles 102 include concave parts 124 and convex parts 126 which creates a smooth expansion and contraction of the flow channel between the baffles 102. The passes 104 are still generally perpendicular to the baffles 102, but the localized surface 122 of the baffle 102 around a particular pass 104 may be concave or convex, depending on where the pass 104 intersects the baffles 102. For example, in some embodiments, the thickness 120 of the baffle 102 may be at its thinnest where a pass 104 intersects the baffle 102. In other examples, the thickness 120 of the baffle 102 may be at its thickest where a pass 104 intersects the baffle 102. This may be the case for all or only some of the intersections 106 between the baffle 102 and passes 104. Due to the waviness of the baffles 102, some perforations 118 may have elongated inlets 128 or outlets 130, but may otherwise be identical to the perforations 88 described for FIGS. 5-6.

Figure 8:
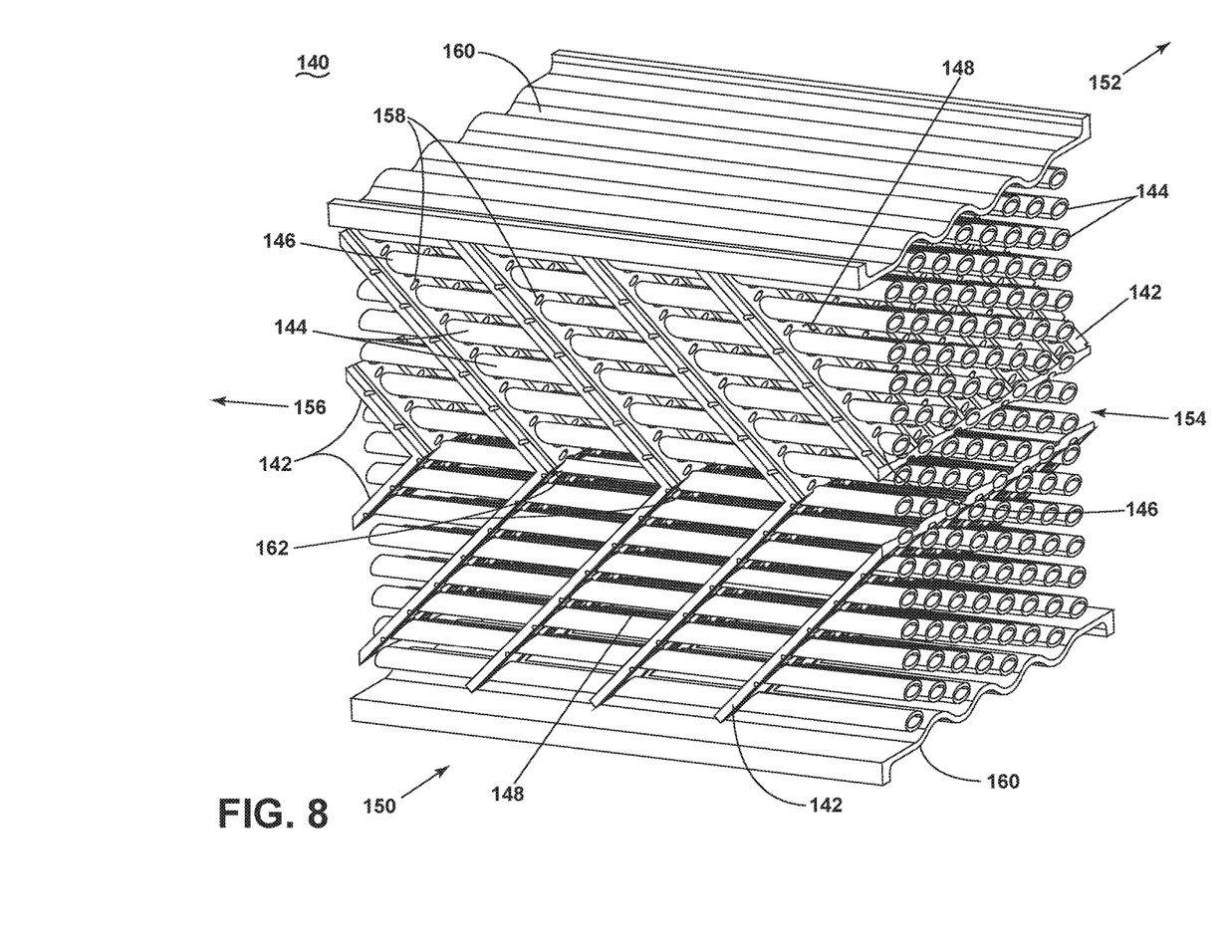
FIG. 8 is a perspective view of a portion of a heat exchanger according to another embodiment of the invention.

FIG. 8 is a perspective view of a portion of a heat exchanger 140 according to another embodiment of the invention. The portion of the heat exchanger 140 shown in FIG. 8 may be substantially similar to the heat exchanger shown in FIG. 1, save for the configuration of the baffles. The portion of the heat exchanger 140 illustrated includes multiple spaced baffles 142 within the cooling air conduit and multiple passes 144 of the hot air conduit that forms multiple intersections 146 with the baffles 142. While not shown, the passes 144 can be connected by multiple returns that connect at least one pass 144 to at least one other pass 144, as described for FIG. 1. Further, the returns may be defined by one or more return manifolds; one return manifold can define multiple returns for the passes 144.

The spaces between the baffles 142 and the passes 144 form openings 148 for cooling air supply 150 and cooling air discharge 152, as designed by arrows in FIG. 8. Hot air supply 154 and hot air discharge 156, also designed by arrows, generally enter and exit the portion of the heat exchanger 140 as shown, although the hot air may follow a serpentine path through the passes 144 themselves, as described for the first embodiment. As for the previous embodiments, multiple perforations 158 extend through the baffles 142, and allow the cooling air to flow through the baffles 142, rather than strictly between the baffles 142, which provides improved heat-transfer characteristics to the heat exchanger. The perforations 158 can be configured as described above for any of the perforations 52, 88, 118 of the previous embodiments.

In FIG. 8, the passes 144 are non-perpendicular to the baffles 142. The baffles 142 shown in FIG. 8 can be angled to form a chevron configuration and are provided between corrugated shells 160. Each baffle 142 extends at an angle from one of the shells 160 to join another baffle 142 extending from the other shell 160 at a vertex 162. The chevron configuration increases the total surface area per unit volume of the baffles 142, which provides improved heat-transfer characteristics to the heat exchanger.

Figure 9:
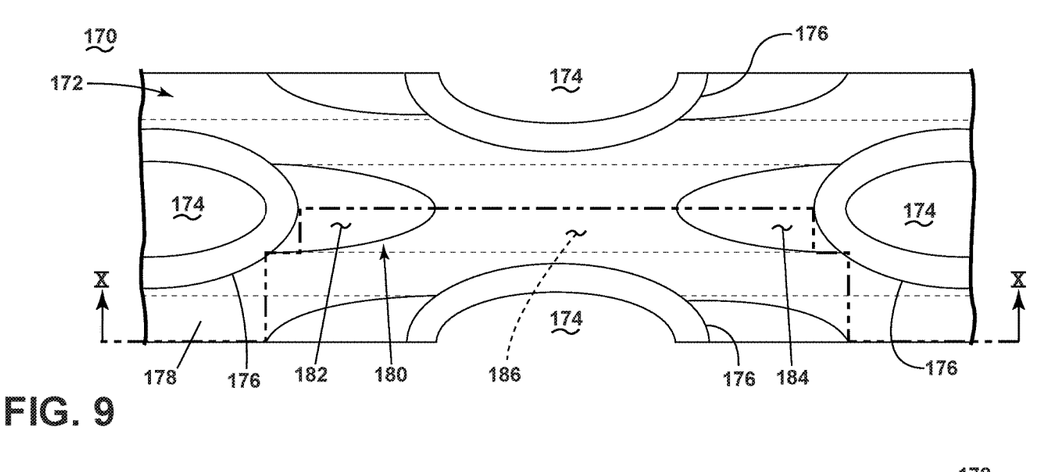
FIG. 9 is a schematic view of a portion of a heat exchanger according to another embodiment of the invention.
Figure 10:
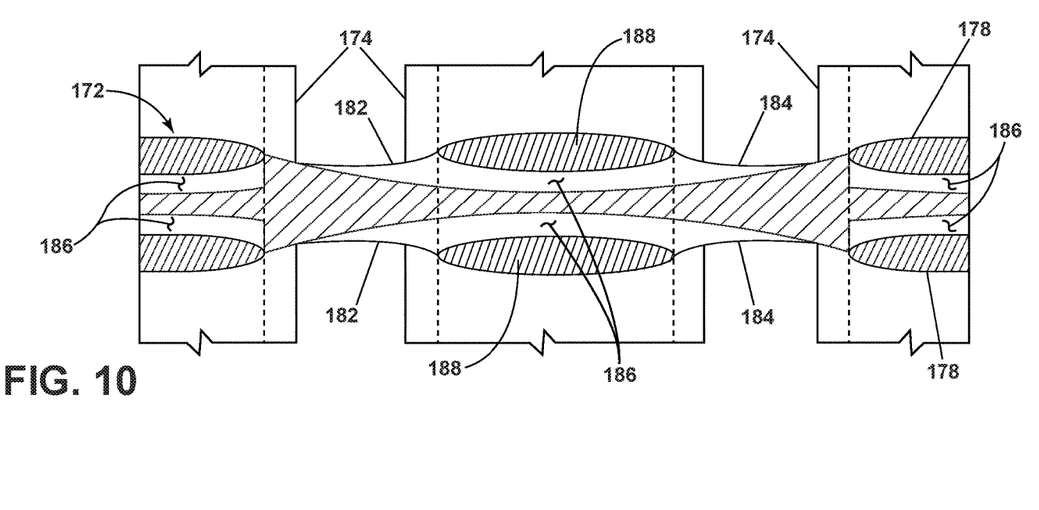
FIG. 10 is a sectional view taken through line X-X of FIG. 9.

FIG. 9 is a schematic view of a portion of a heat exchanger 170 according to another embodiment of the invention, and FIG. 10 is a sectional view taken through line X-X of FIG. 9. The portion of the heat exchanger 170 shown in FIG. 8 may be used with the heat exchanger shown in FIG. 1. In FIGS. 9-10, one baffle 172 is shown, and multiple passes 174 form multiple intersections 176 with the baffle 172 at the opposing surfaces or sides 178 of the baffle 172. The passes 174 are formed as elliptical tubes. While not shown, the passes 174 can be connected by multiple returns that connect at least one pass 174 to at least one other pass 174, as described for FIG. 1. Further, the returns may be defined by one or more return manifolds; one return manifold can define multiple returns for the passes 174.

Multiple perforations 180 extend through the baffle 172, and can comprise an inlet 182, an outlet 184, and a passage 186 connecting the inlet 182 to the outlet 184. In the illustrated embodiment, the inlet 182 and outlet 184 of one perforation 180 are on the same side 178 of the baffle 172. Further, the inlets 182 are provided immediately downstream of the passes 174 and the outlets 184 are provided immediately upstream of the passes 174

Perforations 180 are provided on both sides 178 of the baffle 172, such that each side 178 includes multiple perforations, each with its inlet 182 and outlet 184 being provided on a common side 178 of the baffle 172. The perforations 180 are defined by winglets 188 formed in the baffles 172, which intersect the passes 174. The illustrated winglets 188 are elliptical, and are formed in pairs, such that the baffle 172 includes one winglet pair for each pass 174 that the baffle 172 intersects. Each winglet 188 of a winglet pair is associated with a different side 178 of the baffle 172, such that a pair of perforations 180 are provided on both sides 178 of the baffle 172 for each winglet pair. The winglets 188 define a portion of the passages 186, such that the passage 186 extends "underneath" the winglet 188, or toward the center of the baffle 172, before extending outwardly again toward the outlet 184.

As best seen in FIG. 10, the baffle 172 includes a periodic thickness variation that increases the volumetric modulation of the external flow space. The winglets 188 span the inter-tube flow space of the passes 174 to establish the passages 186 for the perforations.

Figure 11:
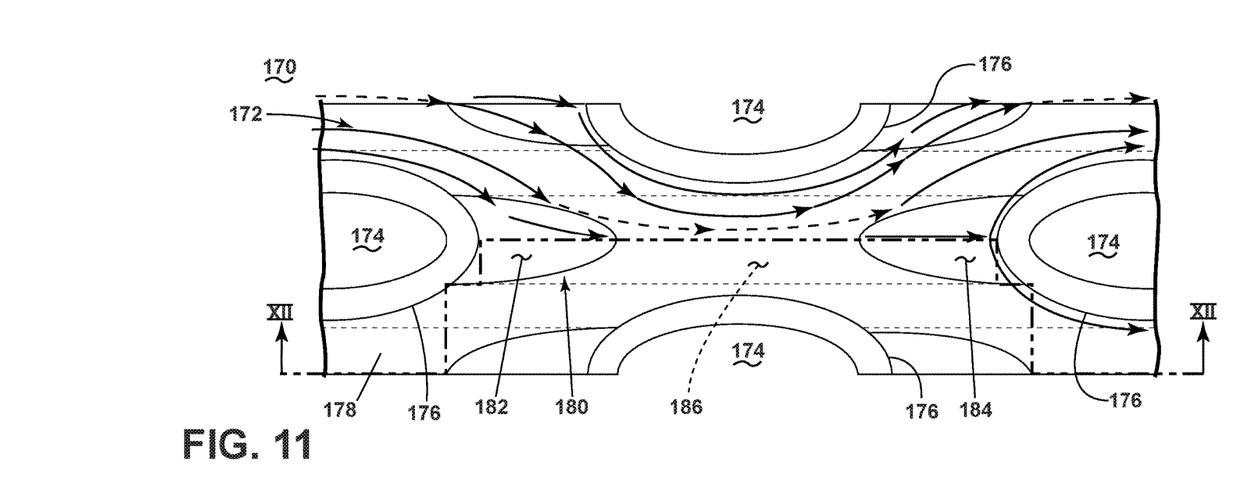
FIG. 11 is a schematic view like FIG. 9, showing a portion of the flow path for cooling air through the portion of the heat exchanger.
Figure 12:
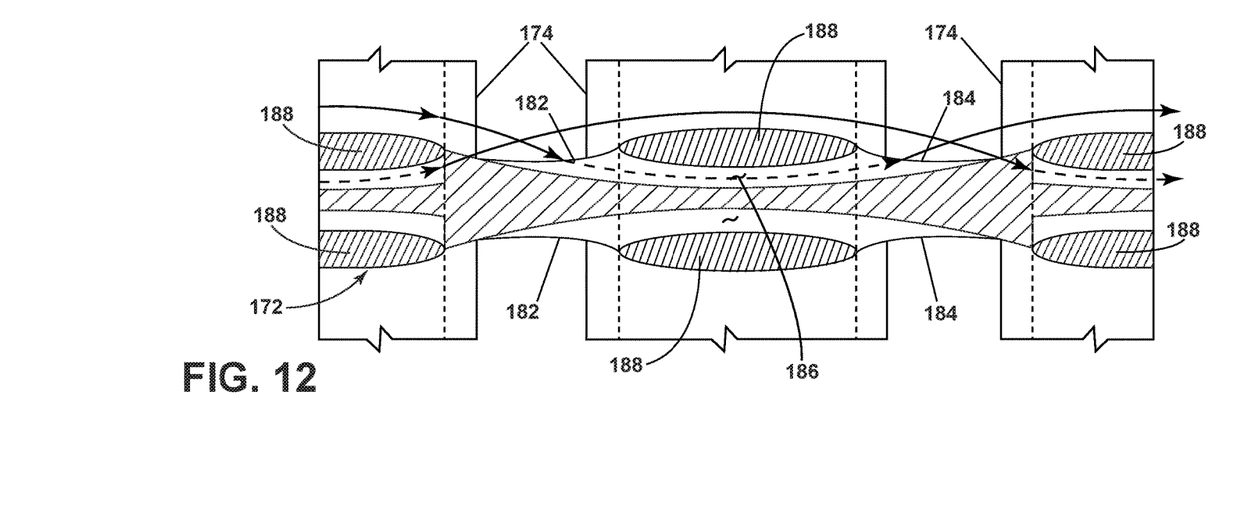
FIG. 12 is a sectional view like FIG. 11 showing a portion of the flow path for cooling air through the portion of the heat exchanger.

FIGS. 11-12 are views like FIGS. 9-10 showing a portion of the flow path for cooling air through the portion of the heat exchanger 170. Arrows are used in FIGS. 11-12 to generally represent the streamlines of the air flow, and it is understood that the actual air flow in operation may deviate from what is represented. Cooling air flows between and through the baffles 172, with portions of the cooling air traveling internally through the perforations 180 and other portions of the cooling air passing externally over the surface 178. Air entering one perforation 180 passes under the winglet 188 defining the passage 186. Air exiting the perforation 180 through the outlet 184 encounters a pass 174 of the hot air conduit, which forces the air to flow around the pass 174, or over another winglet 188.

The embodiments of the heat exchangers disclosed herein can be produced by additive manufacturing or 3D printing construction; the three-dimensional geometry of the disclosed perforated baffles and passes in particular may lend itself to additive manufacturing. These processes have the advantage of being able to produce the complex geometries disclosed herein without requiring a secondary joining process. Alternatively, some embodiments of the invention may be produced using stamping in combination with brazing or another joining process, but is not as preferred as additive manufacturing or 3D printing since highly complex stamping dies would be required. Manufacturing via 3D printing can also eliminate the complexity involved with controlling the geometry of the baffles and tubes while brazing, as well as the reliability issues due to fatigue or quality issues with the braze joints.

The embodiments disclosed herein provide a heat exchanger with perforated baffles to improve heat transfer of the heat exchanger. One advantage that may be realized in the above embodiments is that the above described embodiments provide an improved baffle perforation. Previously, heat exchanger baffles have employed sloped, trapezoidal shoulders to produce the breathing effect. The trapezoidal transitions between the expanded and contracted portions of the flow channel have pressure losses associated with each of these contracted "throats." With the described embodiments, the transitions between the expanded and contracted portions of the flow channel are made smoothly by the non-orthogonal perforations, which reduces pressure loss and further increases the improvement in heat transfer.

The perforated baffles and passes of the heat exchanger can be produced by additive manufacturing or 3D printing construction. Rather than sloped, trapezoidal shoulders used previously, a far more aerodynamically smooth transition can be employed which will reduce the associated minor loss coefficient significantly. Additionally, with an additive manufacturing process, the pattern can be tesselated for nearly arbitrary conformal geometries, not just bricks or simple curves.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A heat exchanger comprising:
a cooling air conduit having at least one baffle;
a hot air conduit having multiple passes through the cooling air conduit and forming multiple intersections with the at least one baffle; and
multiple perforations extending through the at least one baffle, each perforation having an inlet, an outlet, and a passage connecting the inlet and the outlet, with the inlet and the outlet located on the same side of the at least one baffle, and the outlet located downstream of the inlet, wherein the multiple perforations are formed in pairs on opposite sides of the at least one baffle, and the at least one baffle comprises opposing winglets, which define a portion of the respective passage for each of the pairs of multiple perforations such that the respective passage extends under the respective winglet before extending toward the respective outlet.

2. The heat exchanger of claim 1 wherein the multiple passes are spaced in a flow-wise direction along the cooling air conduit.

3. The heat exchanger of claim 2 wherein the multiple passes are staggered in a streamline direction along the cooling air conduit.

4. The heat exchanger of claim 3 wherein the perforations are located between streamline-adjacent intersections.

5. The heat exchanger of claim 4 wherein the at least one baffle has a thickness that varies along the streamline direction along the cooling air conduit, the thickness is thinnest or thickest at the intersections.

6. The heat exchanger of claim 3 wherein the passes are perpendicular to the baffle.

7. The heat exchanger of claim 3 wherein the hot air conduit comprises a serpentine conduit having the multiple passes connected by returns.

8. The heat exchanger of claim 1 wherein the passage defines a centerline and the centerline is non-parallel to a local streamline of the cooling air conduit.

9. The heat exchanger of claim 1 wherein the cooling air conduit comprises multiple, spaced baffles, and the multiple passes form multiple intersections with the multiple, spaced baffles.

10. The heat exchanger of claim 1 wherein the respective passage defines a centerline and the centerline is non-parallel to a local streamline of the first air conduit.

11. A heat exchanger comprising:
a first air conduit having at least one baffle, arranged parallel to a streamline through the first air conduit;
a second air conduit comprising multiple passes extending through the first air conduit, the multiple passes arranged perpendicular to the streamline, and forming multiple intersections with the at least one baffle; and
multiple perforations extending through the at least one baffle, each perforation having an inlet, an outlet, and a passage connecting the inlet and the outlet, with the inlet and the outlet located on the same side of the at least one baffle, and the outlet located downstream of the inlet, wherein the multiple perforations are formed in pairs on opposite sides of the at least one baffle, and the at least one baffle comprises opposing winglets, which define a portion of the respective passage for each of the pairs of multiple perforations such that the respective passage extends under the respective winglet before extending toward the respective outlet.

* * * * *